United States Patent
Fricker et al.

(10) Patent No.: US 10,509,235 B2
(45) Date of Patent: Dec. 17, 2019

(54) METHOD OF CALCULATING OPTICAL CHARACTERISTICS OF AN OPTICAL SYSTEM ACCORDING TO A GIVEN SPECTACLE FRAME

(71) Applicant: Essilor International, Charenton le Pont (FR)

(72) Inventors: Sébastien Fricker, Charenton le Pont (FR); Benjamin Rousseau, Charenton le Pont (FR); Mathieu Guillot, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 83 days.

(21) Appl. No.: 15/301,118

(22) PCT Filed: Mar. 31, 2015

(86) PCT No.: PCT/EP2015/057061
§ 371 (c)(1),
(2) Date: Sep. 30, 2016

(87) PCT Pub. No.: WO2015/150401
PCT Pub. Date: Oct. 8, 2015

(65) Prior Publication Data
US 2017/0017095 A1    Jan. 19, 2017

(30) Foreign Application Priority Data

Apr. 2, 2014 (EP) ..................................... 14305484

(51) Int. Cl.
*G02C 3/00*          (2006.01)
*G02C 7/00*          (2006.01)
(Continued)

(52) U.S. Cl.
CPC ......... *G02C 7/027* (2013.01); *G02B 27/0012* (2013.01); *G02B 27/0172* (2013.01); *G02C 7/086* (2013.01); *G02B 2027/0178* (2013.01)

(58) Field of Classification Search
CPC ... G02C 7/02; G02C 7/06; G02C 7/08; G02C 7/027; G02C 7/028; G02C 7/086;
(Continued)

(56) References Cited

U.S. PATENT DOCUMENTS 6,384,982 B1    5/2002  Spitzer
2010/0045927 A1  2/2010  Moliton et al.
(Continued)

FOREIGN PATENT DOCUMENTS

EP    2 028 533      2/2009
JP    2010-517090 A  5/2010
(Continued)

OTHER PUBLICATIONS

Office Action dated Dec. 21, 2018 in corresponding Japanese Patent Application No. 2016-560412 (with English Translation), 7 pages.

*Primary Examiner* — Mustak Choudhury
(74) *Attorney, Agent, or Firm* — Oblon, McClelland, Maier & Neustadt, L.L.P.

(57) ABSTRACT

A method of calculating an optical system (OS) of an ophthalmic lens according to a given spectacle frame, said ophthalmic lens comprising a back surface (BS) and a front surface (FS) arranged to deliver an ophthalmic vision image (VI), a light-guide optical element having a proximal surface (PS) and a distal surface (DS), said light-guide optical element being arranged to output a supplementary image (SI), wherein the method comprises the steps of: providing at least a morpho-geometrical parameter data of the frame or
(Continued)

of the light-guide optical element; optimizing the optical system (OS) according to at least the morpho-geometrical parameter data as a target.

12 Claims, 5 Drawing Sheets

(51) Int. Cl.
    *G02C 7/02*           (2006.01)
    *G02C 7/08*           (2006.01)
    *G02B 27/01*          (2006.01)
    *G02B 27/00*          (2006.01)

(58) Field of Classification Search
CPC . G02C 7/12; G02C 7/14; G02C 7/101; G02C 11/06; G02C 11/10; G02C 13/005; G02B 27/0012; G02B 27/0172; G02B 27/01; G02B 27/0103; G02B 27/017; G02B 27/0176; G02B 27/1066; G02B 27/1073; G02B 27/144; A61B 3/18

USPC ...... 351/158, 159.4, 159.58, 159.74, 159.76, 351/204, 246; 345/7, 8; 359/630, 633; 703/2

See application file for complete search history.

(56) References Cited

U.S. PATENT DOCUMENTS

2010/0171922 A1\* 7/2010 Sessner ............ G02B 27/0172
                                                    351/158
2012/0057122 A1\* 3/2012 Guillot ............ G02B 27/0172
                                                    351/159.74

FOREIGN PATENT DOCUMENTS

| | | |
|---|---|---|
| JP | 2012-510075 A | 4/2012 |
| JP | 2014-506340 A | 3/2014 |
| WO | WO 2007/017766 | 2/2007 |

\* cited by examiner

METHOD OF CALCULATING OPTICAL CHARACTERISTICS OF AN OPTICAL SYSTEM ACCORDING TO A GIVEN SPECTACLE FRAME

RELATED APPLICATIONS

This is a U.S. national stage application under 35 USC § 371 of International application No. PCT/EP2015/057061 filed on Mar. 31, 2015. This application claims the priority of European application no. 14305484.9 filed Apr. 2, 2014, the entire content of which is hereby incorporated by reference.

FIELD OF THE INVENTION

The invention relates generally to the field of optimization of an ophthalmic lens's optical system (OS) according to a given spectacle frame. More specifically, it relates to a method of calculating an optical system (OS) of an ophthalmic lens according to at least one morpho-geometrical parameter data of the frame, said optical system being arranged to deliver both an ophthalmic vision image (VI) and a supplementary vision (SV) to a lens wearer.

BACKGROUND OF THE INVENTION

Spectacle ophthalmic lens providing an ophthalmic vision and a supplementary vision are well known in the prior art. Said ophthalmic lens has a front surface and a back surface and comprises a light-guide optical element. Said light-guide optical element is a device designed to transport light from a light source (for example light beam generator system) to the wearer's eye to enable information content to be viewed with minimal loss of information. According to an embodiment, light beams are reflected a plurality of times between two "reflection" faces between being introduced into the lens and exiting therefrom, said two reflection faces being faces of the light-guide optical element.

SUMMARY OF THE INVENTION

In the frame of the present invention, the light-guide optical element has to be completely contained within the lens for aesthetical reason and compactness.

A problem that the invention aims to solve is to offer a spectacle ophthalmic lens providing simultaneously both a suitable ophthalmic vision and a suitable supplementary vision to a wearer according to a given spectacle frame.

For this purpose, one aspect of the invention is directed to a method of calculating an optical system (OS) of an ophthalmic lens according to a given spectacle frame, said ophthalmic lens comprising a back surface (BS) and a front surface (FS) arranged to deliver an ophthalmic vision image (OV), where the back surface is positioned closest to a wearer's eye when the ophthalmic lens is worn, the ophthalmic lens comprising a light-guide optical element having a proximal surface (PS) and a distal surface (DS), said light-guide optical element being arranged to output a supplementary image (SI) to the wearer through an exit surface (ES) located on the proximal surface (PS), wherein the method comprises the steps of:
  providing at least a morpho-geometrical parameter data of the frame or of the light-guide optical element;
  optimizing the optical system (OS) according to at least the morpho-geometrical parameter data as a target.

According to an embodiment of the present invention, the morpho-geometrical parameter data is (are) a (a plurality of) morpho-geometrical parameter data of the frame.

In the context of the present invention, the expression "ophthalmic vision" means the visible perception of the scene of a wearer's environment, such that this scene appears to him in front of him by using, if necessary, correcting or solar lenses. Image of the scene originates directly from the wearer's environment when viewing said scene.

Such lenses do not modify the global information which is contained in the scene that are thus perceived even though the image of the scene may be deformed to provide a corrected image according to a wearer's prescription or be tinted thanks to solar lenses.

Unlike the ophthalmic vision, a supplementary vision may provide the subject with information that does not originate directly from his environment. It may be data presented to the subject. For example, navigation data which are projected overlaid on the visor of an airplane pilot's headset constitute a supplementary vision, of the informative vision type. A supplementary vision of another type may supply modified images of certain parts of the subject's environment. Thus, other examples of supplementary vision are the provision of an infrared image which is converted into visible light, or an image of a part of the subject's environment which is enlarged.

In the context of the present invention, the expression "distal surface" means the surface situated farthest to the wearer's eye.

On the contrary, the expression "proximal surface" means the surface situated nearest to the wearer's eye.

A spectacle lens to which the invention is applied is designed to present such supplementary images in the field of vision of the wearer, or in a part of this field, while retaining the ophthalmic vision. In other words, the two visions, ophthalmic and supplementary, are available to the wearer. They may be available simultaneously or alternately. In the case of an informative supplementary vision, the supplementary image corresponds to the visual presentation of information data. These data may appear overlaid on the ophthalmic image, notably with a light intensity which is greater or with a color which is distinct. The ophthalmic image may remain visible or not while the data of the informative supplementary vision are presented to the wearer.

In the context of the present invention, the expression "optical system (OS)" of an ophthalmic lens comprising a light guide optical element is a set of data and/or equations defining the back surface (BS) and the front surface (FS) of said lens, the proximal surface (PS) and the distal surface (DS) of said light guide optical element, the relative position of the said different surfaces and the refractive indexes between the different surfaces.

The calculation step can be performed by using a ray-tracing method or optimization algorithms. These methods are known by the one skilled in the art, for example in the publication "Application of optimization in computer-aided ophthalmic lens design" (P. Allione, F. Ahsbahs and G. Le Saux, in SPIE Vol. 3737, EUROPTO Conference on Design and Engineering of Optical Systems, Berlin, May 1999), which is incorporated by reference in the present document.

Calculating the optical system of a lens with a given front surface is also known from the man skilled in the art and an example of an accurate method is disclosed in patent document WO 2007/017766.

According to an embodiment of the invention, the morpho-geometrical parameter of the spectacle frame and/or of the light-guide optical element is chosen in the list consisting of the pantoscopic angle of the frame; the face form angle of the frame; the base curve of the frame and the contour of the frame; the pantoscopic angle of the light-guide optical element.

According to an embodiment of the invention, the morpho-geometrical parameter is (are) a (a plurality of) morpho-geometrical parameter(s) of the spectacle frame and is (are) chosen in the list consisting of the pantoscopic angle of the frame; the face form angle of the frame; the base curve of the frame and the contour of the frame.

In the context of the present invention:

"pantoscopic angle of a frame" is the vertical component of the angle between the "plane of the lens shape" and the "plane of the frame arms"; "plane of the frame arms" is a plane that include the left arms segment and the right arm segment. Arm Segment is a segment joining the fastening of the arm to the frame shape and the contact point between the arm and the ear of the wearer. In most case, frame arm have a linear/straight part extending from the frame shape to the ear, and this linear/straight part can be taken as a good approximation for segment;

"face form angle" means the angle between the plane of the spectacle front and the plane of the right lens shape, or of the left lens shape; wherein:

"plane of the lens shape" means the plane tangential to the front surface of a plano or demonstration or dummy lens at its boxed centre, when mounted in the frame. Preferably, a plano lens is used;

"plane of the spectacle front" means a plane containing the vertical centrelines of the right and left boxed lens shapes;

the above definitions are given in the international standard ISO13666 which is incorporated by reference in the present document;

"base curve of the frame" is to be understood as the curvature of the closest sphere, in the least-squares sense, to the set of points of a contour of the spectacle frame. By extension a base value for the contour of the spectacle frame (Bm) in diopters can be defined with:

$Bm=(n-1).CURVm$, where $n=1.53$;

"contour of the frame" represents the coordinates of the points along the frame groove where the lens is fitted. If the frame is rimless (without groove), the frame contour is the contour of a demonstration/dummy lens.

"pantoscopic angle of the light-guide optical element" is to be understood as the angle between the normal to the plane of the exit surface of the light guide optical element and the line of sight of the eye in the primary position. Said definition is illustrated on FIGS. 7a and 7b which are here after described.

According to an embodiment, the morpho-geometrical parameter(s) is (are) obtained by measuring a spectacle frame and/or of the system consisting of the frame and of the ophthalmic lens when mounted in said frame.

According to another embodiment, the morpho-geometrical parameter(s) is (are) obtained from a spectacle frame data base.

According to an embodiment, the lens of the invention is a single vision lens.

According to another embodiment, the lens of the invention is a progressive-power lens.

A progressive-power lens or progressive-addition lens is a lens with a positive dioptric add power.

By "progressive addition surface" is meant a continuous, aspheric surface having at least two distance vision zones and a zone connecting said two distance vision zones, where the dioptric power in the connecting zone increases between of the farthest distance vision zone (remote vision zone) and the nearest distance vision zone (closer vision zone).

By "regressive surface" is meant a continuous, aspheric surface having at least two distance vision zones and a zone connecting said two distance vision zones, where the dioptric power in the connecting zone decreases between of the farthest distance vision zone and the nearest distance vision zone.

By "distance vision zone" is meant a zone of the multi-focal lens where the viewer has a comfortable vision for a given distance; distance vision zones are usually chosen within the list consisting far vision zone (far viewing distance, namely viewing distance of more than four meters), intermediate vision zone (medium distance such as computer viewing distance, namely viewing distance of about 60 cm to four meters), near vision zone (reading distance, namely viewing distance of less than 60 cm).

By "dioptric add power" is meant the amount of dioptric power difference between two distance vision zones where said difference is calculated between the dioptric power of the nearest distance vision zone and the dioptric power of the farthest distance vision zone.

Progressive addition ophthalmic lenses are now well known. Such lenses are used to compensate for presbyopia and allow the spectacle wearer to see objects over a wide range of distances, without having to remove his or her glasses. Progressive addition lenses typically, but not limited to, have a remote vision region, located in the top of the lens, a closer vision region located in the bottom of the lens. A prescription for a given presbyopic wearer comprises a prescribed power value for remote vision and a prescribed power addition representative of the power increment needed between remote vision and closer vision. The power addition is termed the "prescribed addition".

According to the wearer's needs, a progressive addition ophthalmic lens encompasses different embodiments such as followings:

the remote vision is the far vision and the closer vision is the near vision;

the remote vision is the intermediate vision and the closer vision is the near vision;

the remote vision is the far vision and the closer vision is the intermediate vision.

According to an embodiment, the ophthalmic lens implemented in the method according to the invention is a progressive addition lens which is chosen within the list consisting of a lens comprising a far vision zone, an intermediate vision zone and a near vision zone; a lens comprising an intermediate vision zone and a near vision zone; a lens comprising a far vision zone and an intermediate vision zone.

According to another embodiment of the present invention, the method of the present invention further comprises the step consisting in:

providing a desired viewing direction for the supplementary image;

wherein the optical system (OS) is optimized also according to the desired viewing direction as a target.

Thus, according to the above embodiment, when the viewing direction for the supplementary image coincides with the wearer's eye direction, the luminous flux (and the luminosity of the supplementary image) perceived by the wearer is maximized.

According to another embodiment of the present invention, the optical system (OS) is optimized with the proviso that a distance d1 between the distal surface (DS) and the front surface (FS) and a distance d2 between the proximal surface (PS) and the back surface (BS) are equal to or more than a threshold value of 0.1 mm, preferably more than 0.2 mm so as to provide mechanical stability to the lens frame. The inventors have determined that a threshold value equal to 0.1 mm is advantageous. A preferred threshold value is 0.2 mm.

According to another embodiment of the present invention that may be combined with anyone of the preceding embodiment(s), the optical system (OS) is also optimized according to a target centre thickness and a target edge thickness of the ophthalmic lens.

In the context of the present invention,
the expression "target centre thickness" means the thickness of a lens measured at its optical centre or design reference point, or, for a progressive-power lens at the prism reference point or any other chosen reference points (for example that can be markings on the lens);
the expression "target edge thickness" means a given thickness at a point on the edge of a lens, cut or uncut, measured approximately parallel to the optical axis.

According to another embodiment of the present invention that may be combined with anyone of the preceding embodiment(s), the method according to the invention further comprises a step consisting in:
providing prescription data of the wearer;
wherein the optical system (OS) is optimized also according to prescription data of the wearer as a target.

In the context of the present invention, the expression "prescription data" means a set of optical characteristics of optical power, of astigmatism and, where relevant, of addition, determined by an ophthalmologist or an eye care practitioner (ECR) in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription data for a progressive lens comprise values of optical power and of astigmatism at the distance-vision point and, where appropriate, an addition value.

According to another embodiment of the present invention that may be combined with anyone of the preceding embodiment(s), the method according to the invention further comprises a step consisting in:
providing an initial position of the light-guide optical element;
wherein the optical system (OS) is optimized also by shifting and/or by tilting the initial position of the light-guide optical element.

According to an embodiment, the tilt angle is comprised between −15° and +15° regarding the initial position of the light-guide optical element.

According to another embodiment, the shift is comprised between −8 mm and +8 mm regarding the initial position of the light-guide optical element.

According to another embodiment of the present invention that may be combined with anyone of the preceding embodiment(s), the exit surface (ES) is defined by an angular aperture contour, denoted $AC(\alpha,\beta)$ and the method according to the invention also comprising a step consisting in:
providing a wearer's accommodative effort threshold (AET);
optimizing the optical system (OS) within $AC(\alpha,\beta)$, so that the wearer's accommodative effort is equal or less to the wearer's accommodative effort threshold (AET) when viewing at the supplementary image (SI).

According to an embodiment, the accommodative effort threshold is determined according to the wearer's age.

For example, one can choose for a young wearer (about 20 years old) an accommodative effort threshold of +10 D.

For a wearer being around 40 years old, one can choose an accommodative effort threshold of +5 D.

For a wearer being around 50 years old, one can choose an accommodative effort threshold of +2 D.

According to another embodiment of the present invention that may be combined with the preceding embodiment, the front surface (FS) and the back surface (BS) of the optical system (OS) are also simultaneously optimized, when $(\alpha,\beta)$ is out of the contour $AC(\alpha,\beta)$, to fulfil the wearer's ophthalmic vision.

According to another embodiment of the present invention that may be combined with anyone of the preceding embodiment(s), the method according to the invention further comprises a step consisting in:
providing design optical data;
wherein the front surface (FS) and/or the back surface (BS) of the optical system (OS) is (are) optimized also according to said design optical data as a target.

According to another embodiment of the present invention that may be combined with the preceding embodiment, the optimisation of respectively the front surface (FS) or the back surface (BS) includes adding prism on a model ophthalmic lens front (FS) or back surface (BS) corresponding to the design optical data of a model ophthalmic lens.

In the context of this the present invention, the expression "design optical data" which is a widely used wording known from the man skilled in the art means the set of parameters allowing to define an optical function of a generic optical system. As for an example, a PAL "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms.

Another aspect of the present invention is directed to a method for manufacturing an addition ophthalmic lens by machining a lens blank according to the optical system (OS) as defined in the preceding embodiments.

Another aspect of the present invention is directed to an ophthalmic lens manufactured according to the method described above, wherein a difference ($\Delta 1$) between an average sphere according to a gaze direction passing through the exit surface (ES) and an average sphere (Periph) at a point of the periphery of the lens is greater than 4 Diopter, ($\Delta 1 > 4$ D), either on the front or on the back surface.

The above embodiment provides an ophthalmic lens compatible with a frame having a high face form angle.

Another aspect of the present invention is directed to a computer program product comprising one or more stored sequence of instruction that is accessible to a processor and which, when executed by the processor, causes the processor to carry out at least the steps described in the preceding embodiments.

Another aspect of the present invention is directed to a computer readable medium carrying one or more sequences of instructions of the computer program product described above.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

When calculating an equipment (right and left eye lenses mounted in a frame) consisting of a lens comprising a light guide optical element and a lens without a light guide optical element, it is preferable to apply the geometry of lens comprising the light guide optical element, according to the invention, to the second lens of the pair. Having similar geometries for both eyes reduces the binocular disparities in terms of prismatic deviations and distortions. It also makes the equipment more aesthetically pleasing. It also reduces the weight disparity between the two lenses.

BRIEF DESCRIPTION OF THE DRAWINGS

Examples will now be described with reference to the accompanying drawings wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

"Horizontal cross section" should be understood as a cross section according to a plane (named horizontal plane) passing through the primary gaze direction and the two Center of Rotation of the Eye (both left and right);

"Vertical cross section" should be understood as a cross section according to a plane (named vertical plane) perpendicular to the horizontal plane and passing through the primary gaze direction.

DETAILED DESCRIPTION OF THE DRAWINGS

Figure 1A:
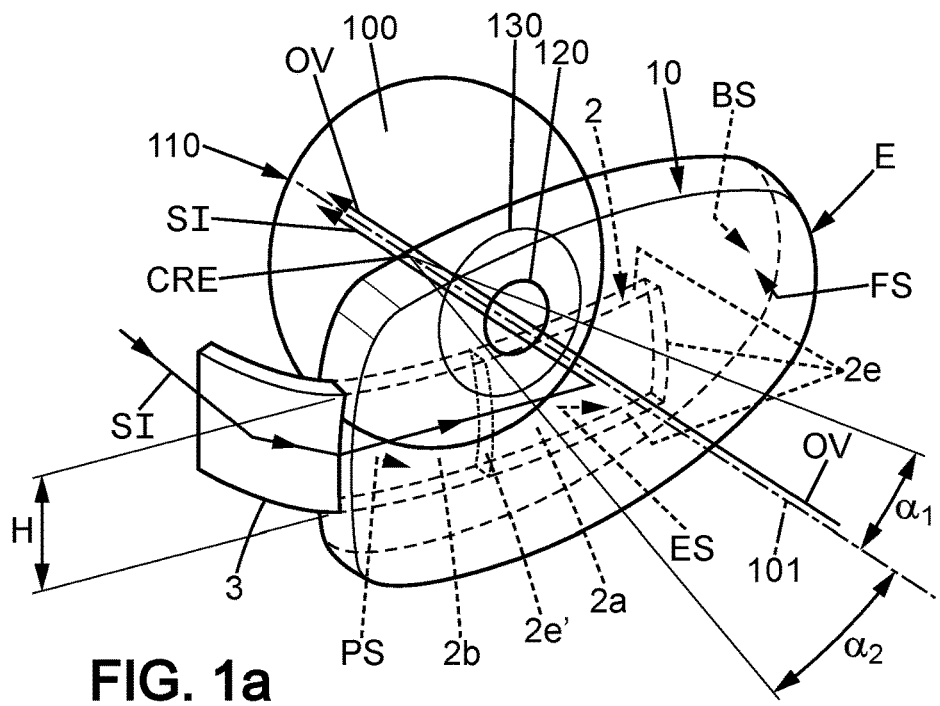
FIGS. 1a and 1b are sketches of an eye of a wearer and of an ophthalmic spectacle lens capable of correcting the wearer's ophthalmic vision and comprising a light guide optical element arranged to output a supplementary image.
Figure 1B:
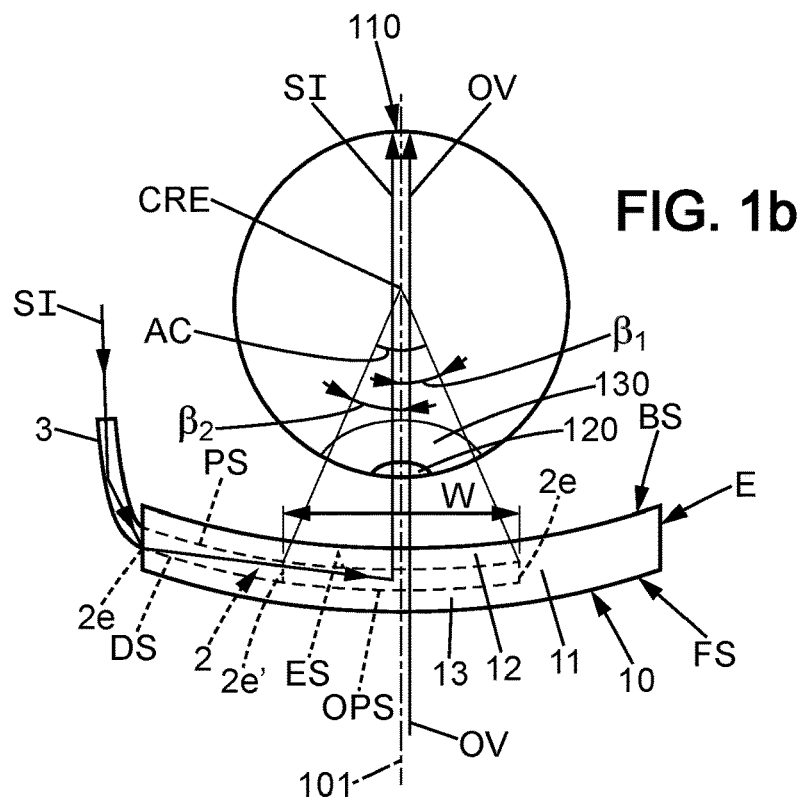

FIGS. 1a and 1b are sketches that illustrate the principle of a spectacle lens 10 which provides both an ophthalmic vision OV and a supplementary vision by outputting a supplementary image SI to an eye 100 of a wearer. The spectacle lens is capable of correcting a wearer's ophthalmic vision; it has a back surface BS and a front surface FS where the back surface is positioned closest to the wearer's eye when the spectacle lens is worn; said spectacle lens also comprises a light guide optical element 2 arranged to output a supplementary image SI to the wearer through an exit surface ES of said light guide optical element.

The lens 10 consists of at least two transparent and refringent materials, which may be any organic or mineral material used in the ophthalmic field. The light guide optical element 2 is inserted between the back surface BS and the front surface FS. The light guide optical element 2 has two opposite faces named "proximal surface" PS and "distal surface" DS where the proximal surface is closer to the eye of the wearer than the distal surface when the spectacle lens is worn. Accordingly the proximal surface PS is the surface of the light guide optical element which is the closest from the back surface BS and the distal surface DS the surface of the light guide optical element which is the closest from the front surface FS.

According to an embodiment the proximal surface PS and the distal surface DS are parallel surfaces;

According to another embodiment the proximal surface PS and the distal surface DS are non-parallel surfaces;

According to an embodiment the proximal surface PS and/or the distal surface DS is a (are) plane surface(s);

According to an embodiment the proximal surface PS and/or the distal surface DS is a (are) curved surface(s); such a curved surface is for example a spherical surface, a toric surface, a sphero-toric surface; such a curved surface can also be an aspherized spherical or toric or sphero-toric surface.

A first transparent and refringent material is situated around the light guide optical element 2; the light guide optical element 2 is made of a second transparent and refringent material; the refractive indexes of said two materials may be identical, slightly different or significantly different.

According to the present embodiment, the lens 10 has a convex front surface FS and a concave back surface BS. The surfaces FS and BS have respective curvatures which together determine, with the value(s) of light refractive index(es) of the material(s) between said two surfaces, an optical power of the spectacle lens, for the ophthalmic vision OV.

In the frame of the present invention, this optical power varies between the directions of sight so as to provide a multifocal vision.

The light guide optical element 2 is appropriate for bringing supplementary light from a source 3 which is not represented in detail so as to produce a supplementary image SI. The structure of the light guide optical element 2 is not the subject of this description, and reference can be made to other documents available on this subject. One example of a suitable light optical element is described in patent document WO2005024491 or in patent document WO200195027 in the name of the LUMUS Company. Generally, this invention can apply to any light optical element embedded in the lens providing supplementary image, for which the supplementary image may be distorted or modified by the optical properties of the back surface FS of the lens.

The lens 10 has a front portion 13 which is between the light guide optical element 2 and the front surface FS, and a rear portion 12 which is between the light guide optical element 2 and the back surface BS.

The light guide optical element 2 is limited transversely within an area of the lens 10 in certain directions approximately parallel to the faces FS and BS. In such a configuration, the front portion 13 and the rear portion 12 of the lens 10 extend beyond a peripheral edge $2e$ of the light guide optical element 2. The lens 10 then has an intermediate portion 11 which extends beyond the edge $2e$ of the light guide optical element 2 and which continually links the portions 13 and 12 to a peripheral edge E of the lens 10.

The light guide optical element 2 is virtually divided in two zones $2a$ and $2b$ separated by a virtual edge $2e'$. Zone $2a$ is the imaging part wherefrom does the supplementary image come from according to the eye of the wearer; zone $2b$ is a propagation part wherein the supplementary image is propagated from the source 3 without supplying an image to the wearer.

The edge of zone $2a$ is the contour of the supplementary image output by the light guide optical element; said supplementary image intercepts the proximal surface PS according to an exit surface ES. One names "opposite surface" OPS the surface corresponding to the exit surface ES on the distal surface. According to the present example the imaging part is substantially a rectangle which width is W and which high is H.

According to a commonly used optical referential, the exit surface ES is defined by an angular aperture contour, denoted $AC(\alpha,\beta)$, $\alpha$ being the eye declination angle and $\beta$ being the eye azimuth angle. $\alpha$, $\beta$ pole is the center of rotation, CRE, of the eye 100 of the wearer behind the lens. 101 corresponds to the axis where $\alpha=\beta=0$.

According to an example, the aperture AC may be +/−15° (degree) either side of an optical axis of the supplementary vision, which passes through the center of the exit surface ES. Said aperture is defined in the azimuthal plane by $|\beta_1|+|\beta_2|$. It is defined in the perpendicular plane by $|\alpha_1|+|\alpha_2|$. The generatrix lines of the limit of the angular aperture contour intersect the back surface BS of the lens in an area in which the two visions, ophthalmic and supplementary, are superposed. In the configuration of FIGS. 1$a$ and 1$b$, the respective optical axes of the ophthalmic vision and of the supplementary vision are one and the same, but they may be distinct.

FIGS. 1$a$ and 1$b$ represent the spectacle lens in the position of use by the wearer. The eye of the wearer 100 is therefore situated behind the lens 10 on the side of the back surface so that it receives, on the one hand, light OV originating from the environment which is situated in front of the lens, and, on the other hand, the light corresponding to the supplementary image SI which is brought by the light guide optical element 2. The light beams of the two lights OV and SI correspond respectively to the ophthalmic vision and to a supplementary vision. They respectively form, after having passed through the pupil 120, an ophthalmic image and a supplementary image on the retina 110 of the wearer. The reference 130 designates the iris of the wearer which surrounds his pupil 120. The direction in which the wearer is looking corresponds to the optical axis of the eye 100. It intersects the surfaces FS and BS of the spectacle lens at respective points which vary when the eye 100 turns in the orbit of the wearer.

Given that the light OV passes through the two surfaces FS and BS of the lens, they both contribute to optical characteristics of the lens which are relative to the ophthalmic vision. However, the light SI does not pass through the surface FS, so that this surface does not contribute to optical characteristics of the lens which are relative to the supplementary vision. Because of this difference between the lights OV and SI, they do not present convergence characteristics which are identical after they have passed through the back surface BS of the lens. For this reason, the ophthalmic and additional images which are formed on the retina may not be simultaneously clear.

The expression "optical characteristics of lens which are relative to one or other of the ophthalmic and supplementary visions" should be understood notably to mean an optical power value, astigmatism values, optical distortion values, etc., of the lens for each direction in which the wearer looks.

Following examples (examples 1 to 5) are given to illustrate embodiments of the method of the present invention.

EXAMPLE 1

Figure 2:
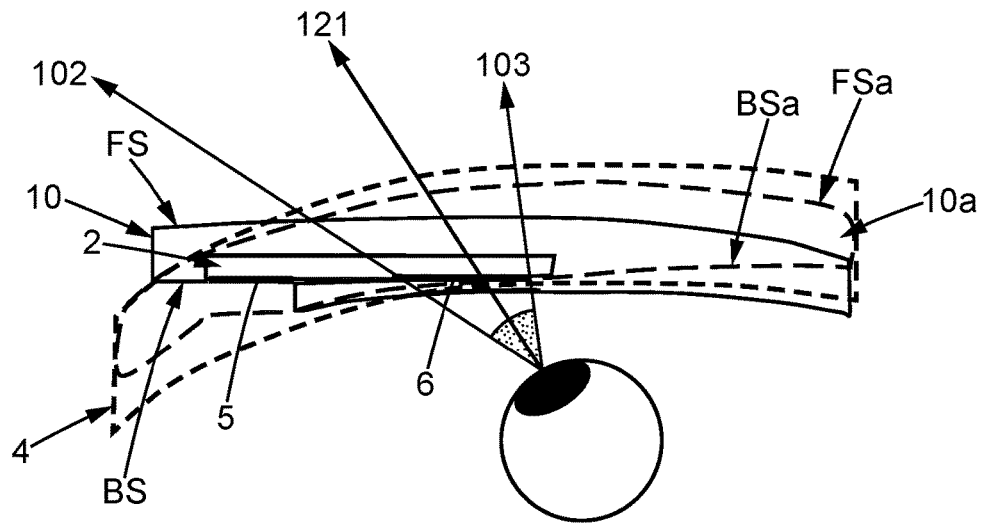
FIG. 2 is a horizontal cross section of an optical system calculated according to the invention in which back and front surfaces of the ophthalmic lens have been optimized according to the base curve of the frame as a target.

Optimization of the Front Surface and the Back Surface According to a Base Curve of the Frame as a Target FIG. 2 represents an optical system of an ophthalmic lens 10 according to the prior art and a given spectacle frame 4 having a predetermined base curve of the frame.

Said ophthalmic lens 10 comprises a back surface (BS) and a front surface (FS) arranged to deliver an ophthalmic vision (OV).

Said ophthalmic lens 10 also comprises a light-guide optical element 2 arranged to input a supplementary image (SI) through an entry surface 5 and output said supplementary image (SI) through an exit surface 6 which is defined by an angular aperture contour, denoted AC($\alpha$,$\beta$) delimited by two directions 102 and 103.

Such an ophthalmic lens 10 cannot be integrally contained within said frame 4.

Thus, in this example, an optical system is calculated according to the predetermined base curve of the frame so as to provide an ophthalmic lens completely contained within the frame of the lens.

In this example, the following parameters data have been provided:
- base curve value of the frame: 4 D
- desired viewing direction for the supplementary image 121 tilted of 0° with the horizontal plane and of −10° with the vertical plane;
- dimensions of the light guide optical element 3: 40 mm large, 25 mm height, 3 mm thick;
- position of said light guide optical element within the ophthalmic lens: the vector between the PRP (prism reference point) and the top left hand corner of the light-guide optical element defines the position of said guide within the lens.
- According to said example, said vector coordinates are x=−27 mm; y=+12.5 mm; z=3.7 mm
- wearer's accommodative effort threshold (AET)=1.5 D.

Firstly, the front FSa and back BSa surfaces of the ophthalmic lens 10a of the optical system (OS) have been optimized within AC($\alpha$,$\beta$), so that the wearer's accommodative effort is equal or less to the wearer's accommodative effort threshold (AET) when viewing at the supplementary image (SI).

The optimization also takes account of the desired viewing direction for the supplementary image. In this example, the targeted prismatic deviation coming from the back surface is close to zero in the desired viewing direction. So, the viewing direction of the optical system is very close to the viewing direction of the optical light guide.

Secondly, the front surface FSa and the back surface BSa of the optical system (OS) have been optimized when ($\alpha$,$\beta$) is out of the contour AC($\alpha$,$\beta$) to generate different curvatures according to the base curve value as a target.

According to an embodiment, optimization steps comprise:
- providing a lens design
- optimizing the front surface in order to match the base curve of the frame;
- optimizing the back surface in order to match the design (as described in patent WO 2007/017766 mentioned above).

During the optimization process, the light optical element geometry (thickness, size) may be taken account so that to ensure that it is embedded between the front surface and the back surface of the lens. If the light optical element is smaller than the frame, this condition does not need to be respected for part of the lens that does not embed the optical element, thus allowing a larger range of curvature modification at the edge of the lens.

Thus, the method according to the invention enables to provide an ophthalmic lens providing simultaneously both a suitable ophthalmic vision and a suitable supplementary vision to a wearer according to a base curve value of the frame as a target.

EXAMPLE 2

Figure 3:
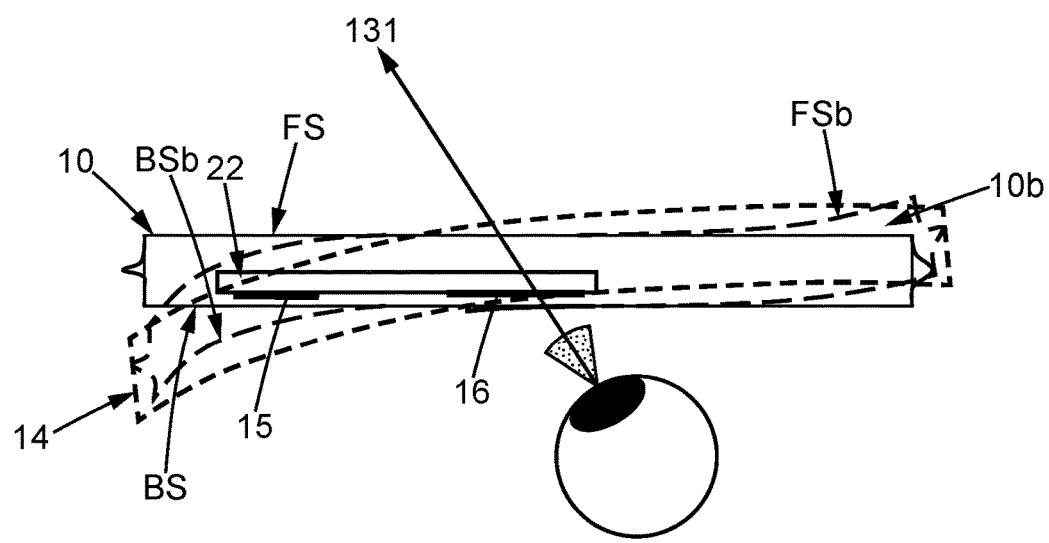
FIG. 3 is a horizontal cross section of an optical system calculated according to the invention in which back and front surfaces of the ophthalmic lens have been optimized according to the face form angle of the frame as a target.

Optimization of the Front Surface and the Back Surface According to a Face Form Angle of the Frame as a Target FIG. 3 represents an optical system of an ophthalmic lens 10 of the prior art and a given spectacle frame 14 having a predetermined face form angle of the frame.

Said ophthalmic lens 10 comprises a back surface (BS) and a front surface (FS) arranged to deliver an ophthalmic vision.

Said ophthalmic lens 10 also comprises a light-guide optical element 22 arranged to input a supplementary image (SI) through an entry surface 15 and output a supplementary image (SI) through an exit surface 16 which is defined by an angular aperture contour, denoted AC($\alpha$,$\beta$).

Such an ophthalmic lens 10 cannot be integrally contained within said frame 14.

Thus, in this example, an optical system is calculated according to the predetermined face form angle of the frame so as to provide an ophthalmic lens completely contained within the frame of the lens.

In this example, the following parameters data have been provided:
- face form angle of the frame=15°;
- desired viewing direction for the supplementary image 131 tilted of 0° with the horizontal plane and of −10° with the vertical plane;
- dimensions of the light guide optical element 3 and position of said light guide optical element as defined in example 1;
- wearer's accommodative effort threshold (AET)=1.5 D Firstly, the front FSb and back BSb surfaces of the ophthalmic lens 10b of the optical system (OS) have been optimized within AC($\alpha$,$\beta$), so that the wearer's accommodative effort is equal or less to the wearer's accommodative effort threshold (AET) when viewing at the supplementary image (SI).

The optimization also takes account of the desired viewing direction for the supplementary image. In this example, the targeted prismatic deviation coming from the back surface is close to zero in the desired viewing direction. So, the viewing direction of the optical system is very close to the viewing direction of the optical light guide.

Secondly, the front surface FSb and the back surface BSb of the optical system (OS) have been optimized when ($\alpha$,$\beta$) is out of the contour AC($\alpha$,$\beta$) according to the face form angle as a target.

This optimization results in a concavo-convex shape of the front surface FSb and the back surface BSb of the ophthalmic lens 10b.

Thus, the method according to the invention enables to provide an ophthalmic lens providing simultaneously both a suitable ophthalmic vision and a suitable supplementary vision to a wearer according to a face form angle of the frame as a target.

During the optimization process, the light optical element geometry (thickness, size) may be taken account so that to ensure that it is embedded between the front surface and the back surface of the lens. If the light optical element is smaller than the frame, this condition does not need to be respected for the part of the lens that does not embed the optical element, thus allowing a larger range of curvature modification at the edge of the lens.

EXAMPLE 3

Optimization of the Front Surface and the Back Surface According to a Face Form Angle of the Frame as a Target (Tilt of the Light Guide Optical Element from its Initial Position)

Figure 4:
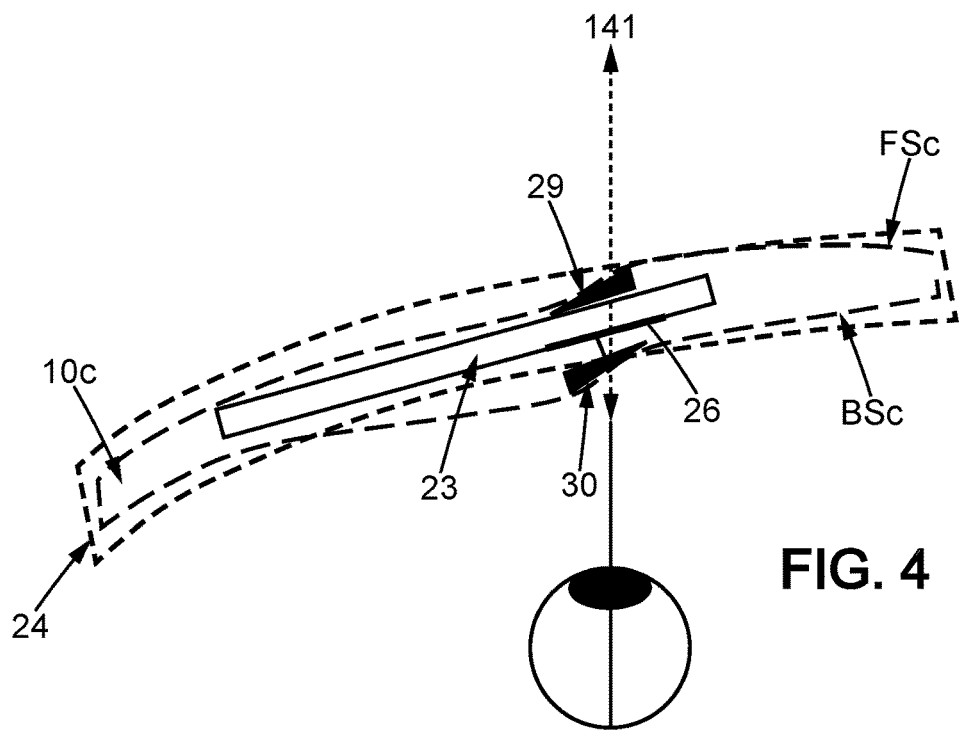
FIG. 4 is a horizontal cross section of an optical system calculated according to the invention in which back and front surfaces of the ophthalmic lens have been optimized according to the face form angle of the frame as a target after a tilt of the light guide optical element from its initial position.

FIG. 4 represents an optical system of an ophthalmic lens 10c which is calculated according to a given spectacle frame 24 having a predetermined face form angle of the frame.

Said ophthalmic lens comprises a back surface BSc and a front surface FSc arranged to deliver an ophthalmic vision.

Said ophthalmic lens also comprises a light-guide optical element 23 arranged to output a supplementary image (SI) through an exit surface 26 which is defined by an angular aperture contour, denoted $AC(\alpha,\beta)$.

In this example, the following parameters data have been provided:
  face form angle of the frame=20°;
  desired viewing direction for the supplementary image 141 tilted of 0° with the horizontal plane and of 0° with the vertical plane;
  dimensions of the light guide optical element 3 and position of said light guide optical element as defined in example 1;
  wearer's accommodative effort threshold (AET)=1.5 D Firstly, the front FSc and back BSc surfaces of the ophthalmic lens of the optical system (OS) have been optimized within $AC(\alpha,\beta)$, so that the wearer's accommodative effort is equal or less to the wearer's accommodative effort threshold (AET) when viewing at the supplementary image (SI).

Secondly, the light guide optical element 23 is tilted of 8° from the horizontal plane so as to provide an optical system having the predetermined face form angle.

Thirdly, since the tilt of the light guide optical element generates a deviation of the supplementary image output from the exit surface 26, back surface BSc and front surface FSc of the optical system are optimized by adding:
  a prism 30 so as to adjust the supplementary image direction;
  a prism 29 so as to adjust the ophthalmic image direction.

EXAMPLE 4

Figure 5:
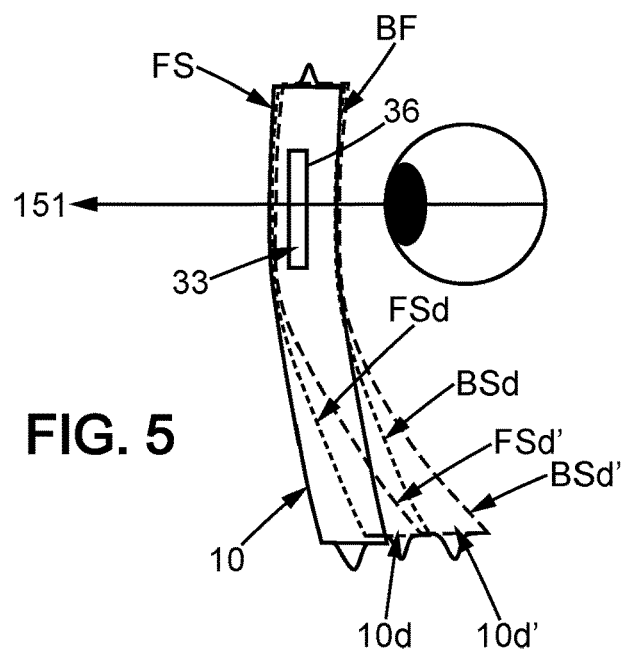
FIG. 5 is a vertical cross section of an optical system calculated according to the invention in which back and front surfaces of the ophthalmic lens have been optimized according to the pantoscopic angle of the frame as a target.

Optimization of the Front Surface and the Back Surface According to a Pantoscopic Angle of the Frame as a Target FIG. 5 represents an optical system of an ophthalmic lens 10 according to a given spectacle frame (not shown on FIG. 5) having a predetermined pantoscopic angle of the frame.

Said ophthalmic lens 10 comprises a back surface (BS) and a front surface (FS) arranged to deliver an ophthalmic vision.

Said ophthalmic lens 10 also comprises a light-guide optical element 33 arranged to output a supplementary image (SI) through an exit surface 36 which is defined by an angular aperture contour, denoted $AC(\alpha,\beta)$.

In this example, the following parameters data have been provided:
  pantoscopic angle of the frame=80°;
  desired viewing direction for the supplementary image 151 tilted of 0° with the horizontal plane and of −10° with the vertical plane;
  dimensions of the light guide optical element 3 and position of said light guide optical element as defined in example 1;
  wearer's accommodative effort threshold (AET)=1.5 D Firstly, the front (FSd,FSd') and back (BSd,BSd') surfaces of the ophthalmic lens (10d,10d') of the optical system (OS) have been optimized within $AC(\alpha,\beta)$, so that the wearer's accommodative effort is equal or less to the wearer's accommodative effort threshold (AET) when viewing at the supplementary image (SI).

Secondly, the front surface (FSd,FSd') and the back surface (BSd,BSd') of the optical system (OS) have been optimized when $(\alpha,\beta)$ is out of the contour $AC(\alpha,\beta)$ according to the pantoscopic angle as a target.

For example, the front and back surfaces FSd and BSd are optimized according to a pantoscopic angle which is lower than the one for which the front and back surfaces FSd' and BSd' are optimized.

Thus, the method according to the invention enables to provide an ophthalmic lens providing simultaneously both a suitable ophthalmic vision and a suitable supplementary vision to a wearer according to a pantoscopic angle of the frame as a target.

During the optimization process, the light optical element geometry (thickness, size) may be taken account so that to ensure that it is embedded between the front surface and the back surface of the lens. If the light optical element is smaller than the frame, this condition does not need to be respected for the part of the lens that does not embed the optical element, thus allowing a larger range of curvature modification at the edge of the lens.

EXAMPLE 5

Optimization of the Front Surface and the Back Surface According to a Pantoscopic Angle of the Frame as a Target (Tilt of the Light Guide Optical Element from its Initial Position)

Figure 6:
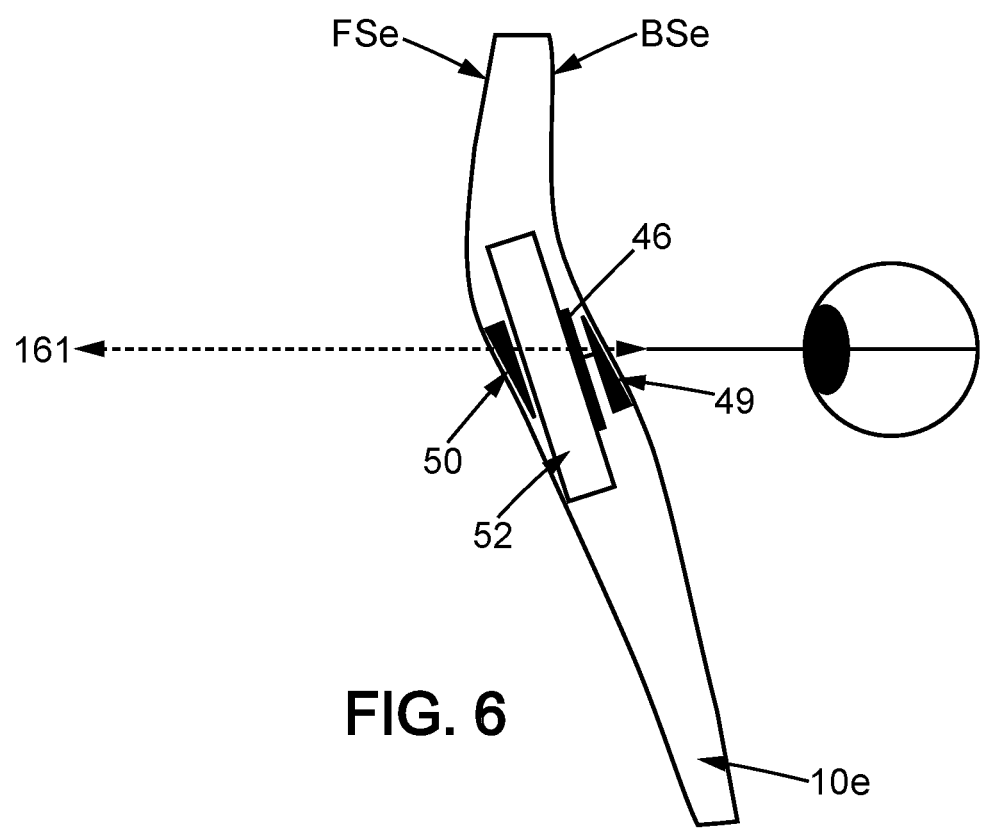
FIG. 6 is a vertical cross section of an optical system calculated according to the invention in which back and front surfaces of the ophthalmic lens have been optimized according to the pantoscopic angle as a target after a tilt of the light guide optical element from its initial position.

FIG. 6 represents an optical system of an ophthalmic lens which is calculated according to a given spectacle frame (not shown on FIG. 6) having a predetermined pantoscopic angle of the frame.

Said ophthalmic lens 10e comprises a back surface BSe and a front surface FSe arranged to deliver an ophthalmic vision.

Said ophthalmic lens also comprises a light-guide optical element 52 arranged to output a supplementary image (SI) through an exit surface 46 which is defined by an angular aperture contour, denoted $AC(\alpha,\beta)$.

In this example, the following parameters data have been provided:
  pantoscopic angle of the frame=75°;
  desired viewing direction for the supplementary image 161 tilted of 0° with the horizontal plane and of −10° with the vertical plane;
  dimensions of the light guide optical element 3 and position of said light guide optical element as defined in example 1;
  wearer's accommodative effort threshold (AET)=1.5 D Firstly, the front FSe and back BSe surfaces of the ophthalmic lens 10e of the optical system (OS) have been optimized within $AC(\alpha,\beta)$, so that the wearer's accommodative effort is equal or less to the wearer's accommodative effort threshold (AET) when viewing at the supplementary image (SI).

Secondly, the light guide optical element is tilted of 5° from the horizontal plane so as to provide an optical system having the predetermined pantoscopic angle.

Thirdly, since the tilt of the light guide optical element generates a deviation of the supplementary image output from the exit surface 46, back surface and front surface of the optical system are optimized by adding:
- a prism 49 so as to adjust the supplementary image direction;
- a prism 50 so as to adjust the ophthalmic image direction.

Figure 7A:
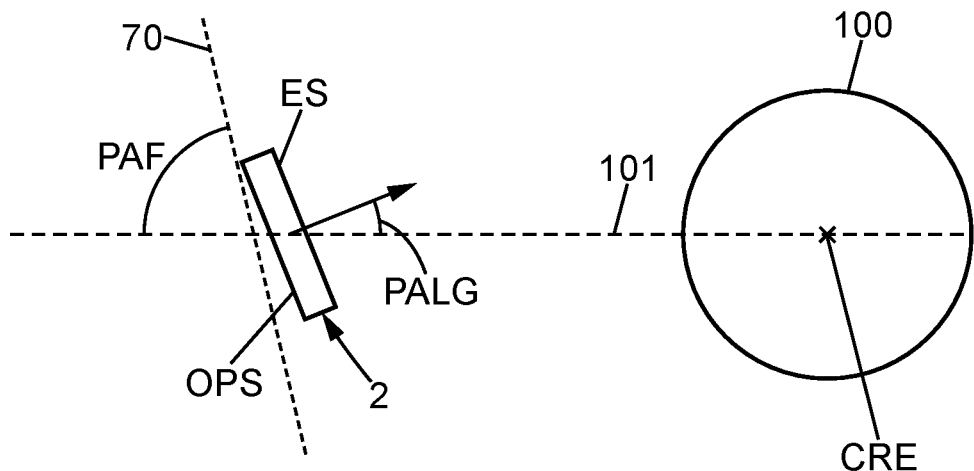
FIGS. 7a and 7b are sketches of an eye of a wearer and of a light guide optical element arranged to output a supplementary image, where said figures illustrate the definitions of the pantoscopic angle of a frame and of the pantoscopic angle of a light-guide optical element.
Figure 7B:
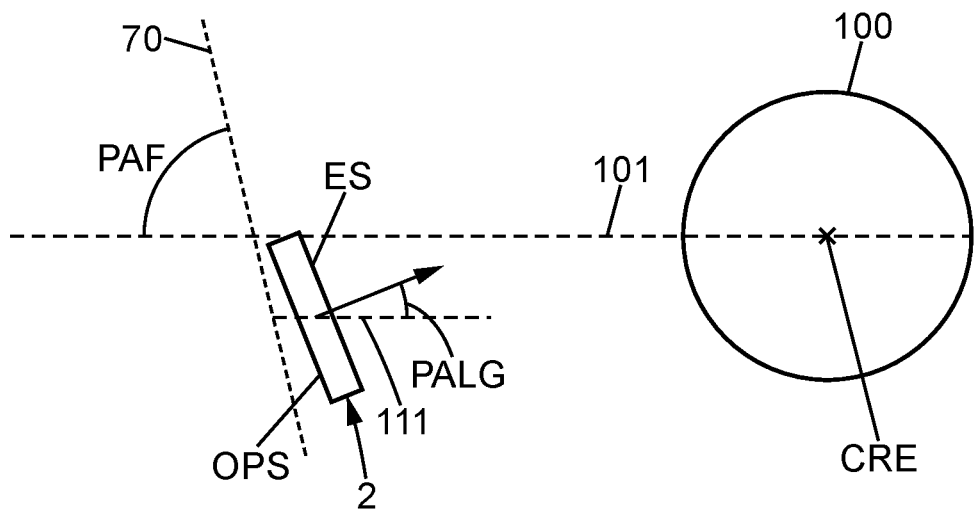

FIGS. 7*a* and 7*b* are sketches of an eye 100 of a wearer and of a light guide optical element 2 arranged to output a supplementary image in a spectacle lens capable of correcting the wearer's ophthalmic where said lens is incorporated in a frame.

In these embodiments, the plane of the figures is a vertical plane.

Axis 101 corresponds to the primary position of the eye, i.e. to an axis where $\alpha=\beta=0$, and passing through the Center of Rotation of the eye (CRE).

PAF represents the pantoscopic angle of the frame; it is the vertical component of the angle between the plane of the lens shape and the plane of the frame arms; the pantoscopic angle of the frame is thus defined only on the basis of geometric features of the frame. In FIGS. 7*a* and 7*b*, the plane of the lens shape refers to the plane perpendicular to the plane of the figures that encompasses dotted line 70; in these examples, the plane of the frame arms is a horizontal plane when the frame is worn by the wearer; said plane is the plane perpendicular to the plane of the figures that encompasses line 101. In said embodiment, the pantoscopic angle of the frame is about 75°. According to other embodiments, the plane of the frame arms is not a horizontal plane.

PALG represents the pantoscopic angle of the light-guide optical element; it is the angle between the normal to the plane of the exit surface of the light guide optical element and the line of sight of the eye in the primary position corresponding to axis 101 which corresponds to the axis where $\alpha=\beta=0$.

FIG. 7*a* shows an embodiment where the light-guide optical element is vertically centered on line 101; pantoscopic angle of the light-guide optical element, PALG, is then the angle between line 101 and the normal to the plane of the exit surface, ES.

FIG. 7*b* shows an embodiment where the light-guide optical element is vertically shifted from line 101; line 111 is a line parallel to line 101 and intersecting the normal to the plane of the exit surface pantoscopic angle of the light-guide optical element; PALG, is then the angle between a line 111 and the normal to the plane of the exit surface, ES.

As shown in examples 4 and 5, one can optimize the front surface and the back surface according to a pantoscopic angle of the frame as a target.

One can optimize, on a similar way, the front surface and the back surface according to a pantoscopic angle of the light-guide optical element as a target.

The invention has been described above with the aid of an embodiment without limitation of the general inventive concept; in particular the optimization criteria are not limited to the examples discussed.

The invention claimed is:

1. A method of calculating optical characteristics of an optical system of an ophthalmic lens according to a given spectacle frame, said ophthalmic lens comprising a back surface and a front surface arranged to deliver an ophthalmic vision image, where the back surface is positioned closest to a wearer's eye when the ophthalmic lens is worn, the ophthalmic lens comprising a light-guide optical element having a proximal surface and a distal surface, said light-guide optical element being arranged to output a supplementary image to the wearer through an exit surface located on the proximal surface, the method comprising:
    obtaining, by processing circuitry, at least morpho-geometrical parameter data of the frame or of the light-guide optical element; and
    optimizing, by the processing circuitry, the optical system according to at least the morpho-geometrical parameter data as a target, the morpho-geometrical parameter data of the spectacle frame or of the light-guide optical element being chosen from the list consisting of a pantoscopic angle of the frame, a face form angle of the frame, a base curve of the frame and a contour of the frame, or a pantoscopic angle of the light-guide optical element, the optical system being optimized with the proviso that a distance d1 between the distal surface and the front surface and a distance d2 between the proximal surface and the back surface are equal to or more than 0.2 mm.

2. The method of calculating optical characteristics of an optical system as claimed in claim 1, further comprising:
    obtaining a desired viewing direction for the supplementary image;
    wherein the optical system is optimized also according to the desired viewing direction as a target.

3. The method of calculating optical characteristics of an optical system as claimed in claim 1, wherein the optical system is optimized also according to a target centre thickness and a target edge thickness of the ophthalmic lens.

4. The method of calculating optical characteristics of an optical system as claimed in claim 1, further comprising:
    obtaining prescription data of the wearer;
    wherein the optical system is optimized also according to prescription data of the wearer as a target.

5. The method of calculating optical characteristics of an optical system as claimed in claim 1, further comprising:
    obtaining an initial position of the light-guide optical element;
    wherein the optical system is optimized also by shifting and/or by tilting the initial position of the light-guide optical element.

6. The method of calculating optical characteristics of an optical system as claimed in claim 1, wherein the exit surface is defined by an angular aperture contour, denoted $AC(\alpha,\beta)$, said method also comprising:
    obtaining a wearer's accommodative effort threshold; and
    optimizing the optical system within $AC(\alpha,\beta)$, so that the wearer's accommodative effort is equal or less to the wearer's accommodative effort threshold when viewing at the supplementary image.

7. The method of calculating optical characteristics of an optical system as claimed in claim 6, wherein the front surface and the back surface of the optical system are simultaneously optimized, when $(\alpha,\beta)$ is out of the contour $AC(\alpha,\beta)$, to fulfil the wearer's ophthalmic vision.

8. The method of calculating optical characteristics of an optical system as claimed in claim 1, further comprising:
    obtaining design optical data;
    wherein the front surface and/or the back surface of the optical system is (are) optimized also according to said design optical data as a target.

9. The method of calculating optical characteristics of an optical system as claimed in claim 8, wherein the optimization of respectively the front surface or the back surface includes adding prism on a model ophthalmic lens front or back surface corresponding to the design optical data of a model ophthalmic lens.

10. A method for manufacturing an addition ophthalmic lens by machining a lens blank according to the optical system of claim 1.

11. An ophthalmic lens manufactured by machining a lens blank according to an optical system, the ophthalmic lens comprising:
   a back surface and a front surface arranged to deliver an ophthalmic vision image, where the back surface is positioned closest to a wearer's eye when the ophthalmic lens is worn; and
   a light-guide optical element having a proximal surface and a distal surface, the light-guide optical element being arranged to output a supplementary image to the wearer through an exit surface located on the proximal surface, wherein a difference ($\Delta 1$) between an average sphere according to a gaze direction passing through the exit surface and an average sphere at a point of a periphery of the lens is greater than 4 Diopter, ($\Delta 1 > 4D$), either on the front surface or on the back surface, the optical system being optimized according to at least morpho-geometrical parameter data of a spectacle frame or of the light-guide optical element as a target, the morpho-geometrical parameter data of the spectacle frame or of the light-guide optical element being chosen from the list consisting of a pantoscopic angle of the frame, a face form angle of the frame, a base curve of the frame and a contour of the frame, or a pantoscopic angle of the light-guide optical element.

12. A non-transitory computer readable medium including computer executable instructions, wherein the instructions, when executed by a computer, cause the computer to perform a method of calculating optical characteristics of an optical system of an ophthalmic lens according to a given spectacle frame, said ophthalmic lens comprising a back surface and a front surface arranged to deliver an ophthalmic vision image, where the back surface is positioned closest to a wearer's eye when the ophthalmic lens is worn, the ophthalmic lens comprising a light-guide optical element having a proximal surface and a distal surface, said light-guide optical element being arranged to output a supplementary image to the wearer through an exit surface located on the proximal surface, the method comprising:
   obtaining at least morpho-geometrical parameter data of the frame or of the light-guide optical element; and
   optimizing the optical system according to at least the morpho-geometrical parameter data as a target, the morpho-geometrical parameter data of the spectacle frame or of the light-guide optical element being chosen from the list consisting of a pantoscopic angle of the frame, a face form angle of the frame, a base curve of the frame and a contour of the frame, or a pantoscopic angle of the light-guide optical element, the optical system being optimized with the proviso that a distance d1 between the distal surface and the front surface and a distance d2 between the proximal surface and the back surface are equal to or more than 0.2 mm.

* * * * *